April 18, 1950 R. B. DOME 2,504,663

AUTOMATIC FREQUENCY CONTROL FOR TELEVISION RECEIVERS

Filed Nov. 12, 1947

Inventor:
Robert B. Dome,
by
His Attorney.

Patented Apr. 18, 1950

2,504,663

UNITED STATES PATENT OFFICE 2,504,663

AUTOMATIC FREQUENCY CONTROL FOR TELEVISION RECEIVERS

Robert B. Dome, Geddes Township, Onondaga County, N. Y., assignor to General Electric Company, a corporation of New York Application November 12, 1947, Serial No. 785,226

1 Claim. (Cl. 178—5.8)

Figure 1:
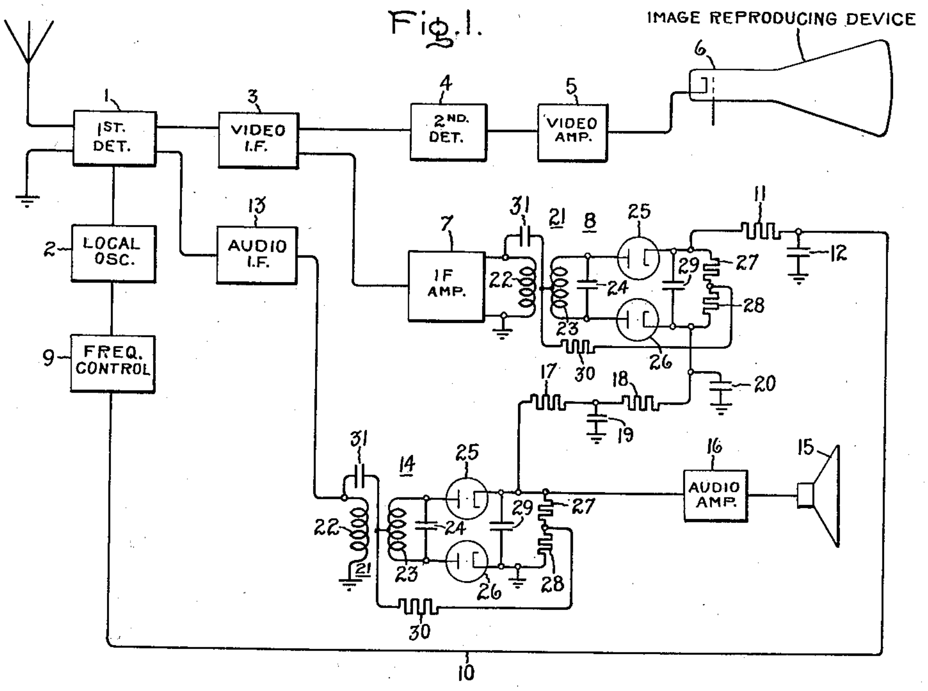

My invention relates to television receiving systems and the like, and more particularly to means for controlling the frequency of the local heterodyne oscillator in such types of receivers.

In the conventional type of television system the video and synchronizing signals are radiated on a video carrier wave and the audio signals are radiated on an audio carrier wave displaced a short frequency interval from the video carrier. These two carrier waves are usually received together in the television receiver, and amplified in a radio frequency amplifier stage. The resulting output is applied to a first detector stage where it is mixed with oscillations from a local heterodyne oscillator. The intermediate frequency output of the first detector stage is applied to a video channel, by means of an intermediate frequency amplifier which is responsive only to the video carrier wave frequency and its associated side bands, and the output of the first detector stage is also applied to an audio channel by means of a further intermediate frequency amplifier which is responsive only to the audio carrier wave frequency and its associated side bands. The outputs of these intermediate frequency amplifiers are applied respectively through various conventional stages to the usual image reproducing device and signal translating device.

The present day trend in television systems, due to the crowding of available channels, is toward the higher frequency channels. It is possible that these higher frequency channels will extend as far into the high frequency spectrum as 920 megacycles. Although the local heterodyne oscillator in a television receiver can be designed to have a relatively low frequency drift in the vicinity of 50 megacycles, this is not possible at the higher frequencies and some means of controlling the frequency drift in the local oscillator at these higher frequencies is necessary.

The usual frequency control systems for radio receivers comprise a frequency discriminator, the output of which is coupled to the local oscillator of the receiver by the way of a reactance tube control circuit whereby any drift in the frequency of the local oscillator gives rise to a potential in the discriminator output which is applied to the control circuit which in turn controls the frequency of the local oscillator to compensate for this frequency drift.

It is an object of my invention to provide an automatic frequency control for television receivers and the like which is responsive to wide frequency drifts of the local heterodyne oscillator.

It is a further object of my invention to provide a frequency discriminator in the video channel and a further frequency discriminator in the audio channel, and to cause these two discriminators jointly to effect a wide channel frequency control on the local oscillator in a television receiver.

The novel features which I believe to be characteristic of my invention are set forth in the claim. My invention itself, however, both as to its organization and method of operation will be best understood by reference to the following description taken in connection with the accompanying drawing in which Fig. 1 is a representation, partly schematic, of a television receiver embodying the invention, and Fig. 2 shows various curves illustrating the manner in which the frequency drift of the local oscillator of the receiver in Fig. 1 is controlled.

Figure 2:
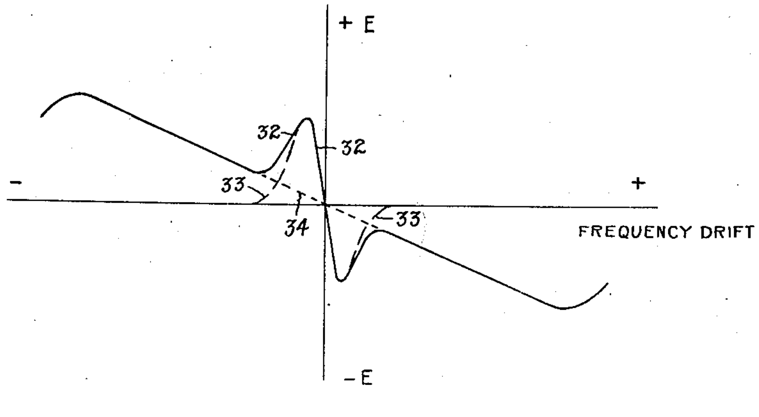

Referring now to the drawing and more particularly to Fig. 1, I have shown a usual type of television receiver in which the frequency of the local oscillator is controlled by means of my novel frequency control circuit. I have shown at 1 the first detector stage of such a receiver, this stage may include suitable radio frequency amplifiers and a mixing stage and its pass band characteristics extend to include the video carrier and the audio carrier. The received signals are heterodyned in this stage by local oscillations derived from a local oscillator stage 2 and the resulting intermediate frequency signals are applied to a video I. F. amplifier 3, and to an audio I. F. amplifier 13. The output of amplifier 3 is divided in two paths. The first path includes a second detector stage 4 and a video amplifier stage 5. The output of the video amplifier stage 5 is applied to an image reproducing device 6. The components in this path are conventional and form no part of the present invention, and further description is believed to be unnecessary.

The output of the video I. F. amplifier 3 is also applied to a further intermediate frequency amplifier 7 by way of the second path, and the output of the amplifier 7 is coupled to a frequency discriminator 8. A control voltage is derived from the frequency discriminator 8, the potential and sign of this control voltage being dependent on the magnitude and drift of the frequency of the local oscillator 2, and this control voltage is applied to a reactance tube frequency control stage 9 by way of a lead 10 through a low pass filter consisting of a series resistor 11 and a shunt capacitor 12, the frequency control stage 9 being coupled to the local oscillator 2 controlling the frequency thereof in the usual way.

The first detector stage 1 is also coupled to an audio intermediate frequency amplifier stage 13 and the output of this stage is applied to a second frequency discriminator 14. Signals from the discriminator 14 are applied to a signal translating device 15 through an audio amplifier 16. The discriminator 14 is further connected to the discriminator 8, as shown, through a resistance-capacitance filter consisting of resistors 17 and 18 and shunt capacitors 19 and 20, for bypassing the audio frequencies.

The discriminators 8 and 14 may be of any conventional type and in the embodiment shown in Fig. 1, they are similar to the discriminators disclosed in Patent 2,121,103, granted June 21, 1938, to Seeley. The present discriminators 14 and 8 each comprise a transformer 21 having a primary winding 22 and a secondary winding 23 tuned by a capacitor 24 to the desired carrier frequency of the respective video or audio intermediate frequency channel. Sum and difference voltages of the primary winding 22 and the secondary winding 23 are applied respectively to the anodes of the diodes 25 and 26. Load resistors 27 and 28, bypassed by a capacitor 29 are provided for the diodes 25 and 26. The common junction of the load resistors 27 and 28 is connected to the center tap of the secondary winding 23 through a resistor 30. The high potential side of the primary winding 22 is also connected to the center tap of the secondary winding 23 through a capacitor 31. It can be seen that the sum and difference voltages of the primary winding 22 and the secondary winding 23 are applied respectively to the diodes 25 and 26. At the mean intermediate frequency in the respective channels the sum of the voltages across the load resistors is zero but if this frequency shifts, a control potential is developed across the load resistors, the amplitude and sign of this control potential depending on the magnitude and direction of the frequency signal in the respective channels.

The frequency discriminator 8 is tuned to the desired carrier frequency of the video intermediate frequency channel and the frequency discriminator 14 is tuned to the mean intermediate frequency in the audio channel. Therefore, the discriminator 8 and the discriminator 14 operate to control the frequency of the local oscillator 2 through the frequency control stage 9. The discriminator 8 operates in the video channel which has a broad band width and even for wide frequency drifts in the local oscillator this discriminator is effective in producing a control voltage which controls the frequency of the local oscillator 2 to compensate for this frequency drift. The discriminator 8 therefore operates for wide frequency drifts to cause the local oscillator frequency to shift until it approximates its required frequency. This brings the local oscillator into the zone of the audio channel and the discriminator 14 then contributes a control voltage to further change the local oscillator frequency until the correct position for normal reception is obtained.

Referring now to Fig. 2, the solid curve 32 is the net control potential across the capacitor 12 and is made up of the sum of the potentials across the load resistors of the discriminator 14, shown as the dashed curve 33, and the voltage across the load resistor of the discriminator 8, shown as the dotted curve 34. Thus, for example, if the frequency units are considered as megacycles, the video channel may control over a range of mistuning of −1.0 to −.2 megacycle and from +.2 megacycle to +1.0 megacycle, and the audio channel assumes control from −0.2 megacycle to +0.2 megacycle.

Although I have shown the audio channel as being applied to the demodulation of frequency modulated audio signals, it is obvious that this channel is not limited to this type of modulation, and the audio amplifier 16 may be connected to the junction of the load resistors 27 and 28 of the frequency discriminator 14 and this channel then responds to amplitude modulation in the audio signals.

I have therefore provided an automatic frequency control circuit for a television receiver which is sensitive to a wide range of frequency drift of the local heterodyne oscillator and which effectively maintains this oscillator at its required frequency.

Although I have shown a preferred embodiment of my invention, other embodiments and modifications will occur to those skilled in the art and I intend to cover in the appended claim all equivalent modifications as fall within the true spirit and scope of my disclosure.

What I claim as new and desire to secure by Letters Patent of the United States is:

In a television receiver, means for intercepting a radio signal comprising a video and an audio carrier wave, a local oscillator, means for heterodyning said intercepted signal with oscillations from said local oscillator for deriving intermediate frequency video and audio signals, a first channel responsive to said video intermediate frequency signals and a second channel responsive to said audio intermediate frequency signals, a first frequency discriminator included in said first channel for deriving a first automatic frequency control potential, a second frequency discriminator included in said second channel for deriving a second automatic frequency control potential, said frequency discriminators having output circuits connected in series addition, means for deriving a combined control potential from said series connected output circuits, and means for applying said combined control potential to said local oscillator to control the frequency thereof.

ROBERT B. DOME.

REFERENCES CITED

The following references are of record in the file of this patent:

UNITED STATES PATENTS

| Number | Name | Date |
|---|---|---|
| 2,169,883 | Poffrath | Aug. 15, 1939 |
| 2,211,750 | Humby | Aug. 20, 1940 |
| 2,232,390 | Katzin | Feb. 18, 1941 |
| 2,269,041 | Schussler | Jan. 6, 1942 |
| 2,270,023 | Ramsay | Jan. 13, 1942 |
| 2,354,827 | Peterson | Aug. 1, 1944 |
| 2,410,817 | Ginzton | Nov. 12, 1946 |
| 2,425,922 | Crosby | Aug. 19, 1947 |
| 2,481,902 | Bradley | Sept. 13, 1949 |

FOREIGN PATENTS

| Number | Country | Date |
|---|---|---|
| 868,701 | France | Oct. 13, 1941 |
| 519,631 | Great Britain | Apr. 2, 1940 |